United States Patent
Nikitenko

(10) Patent No.: US 9,841,527 B2
(45) Date of Patent: Dec. 12, 2017

(54) APPARATUS AND METHOD FOR DOWNHOLE TRANSIENT RESISTIVITY MEASUREMENT AND INVERSION

(71) Applicant: Marina N. Nikitenko, Novosibirsk (RU)

(72) Inventor: Marina N. Nikitenko, Novosibirsk (RU)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 992 days.

(21) Appl. No.: 13/903,665

(22) Filed: May 28, 2013

(65) Prior Publication Data

US 2014/0136115 A1 May 15, 2014

(30) Foreign Application Priority Data

Nov. 15, 2012 (WO) ................ PCT/RU2012/000938

(51) Int. Cl.
*G01V 3/00* (2006.01)
*G01V 3/28* (2006.01)

(52) U.S. Cl.
CPC ..................... *G01V 3/28* (2013.01)

(58) Field of Classification Search
CPC ............ G01V 3/28; G01V 3/081; G01V 3/30
See application file for complete search history.

(56) References Cited

U.S. PATENT DOCUMENTS

| | | | |
|---|---|---|---|
| 4,626,773 A | 12/1986 | Kroeger et al. | |
| 5,452,761 A | 9/1995 | Beard et al. | |
| 5,881,310 A * | 3/1999 | Airhart ................ | E21B 47/124 710/3 |
| 7,324,899 B2 | 1/2008 | Zhdanov | |
| 7,865,177 B2 | 1/2011 | Sorrells et al. | |
| 7,941,273 B2 | 5/2011 | Thomsen et al. | |
| 8,049,507 B2 | 11/2011 | Rabinovich et al. | |
| 2009/0281731 A1 | 11/2009 | Morrison et al. | |
| 2010/0109672 A1 | 5/2010 | Rabinovich et al. | |
| 2010/0125439 A1 | 5/2010 | Reiderman et al. | |

OTHER PUBLICATIONS

Yingst et al., "Application of Time Domain and Single Frequency Waveform Inversion to Real Data", May 23-26, 2011, 73$^{rd}$ EAGE Conference & Exhibition incorporating SPE EUROPEC, F031, pp. 1-5.*

(Continued)

*Primary Examiner* — Mischita Henson
(74) *Attorney, Agent, or Firm* — Cantor Colburn LLP

(57) ABSTRACT

A method of processing electromagnetic signal data includes: disposing a downhole tool in a borehole in an earth formation, the downhole tool including at least one electromagnetic transmitter; performing a downhole electromagnetic operation, the operation including transmitting an electromagnetic pulse from the transmitter into the formation and measuring a time domain transient electromagnetic (TEM) signal over a selected time interval following a transmitter turn-off time; transforming the measured time domain TEM signal into a frequency domain TEM signal measured; and applying an inversion technique to the transformed frequency domain TEM signal to estimate one or more formation parameters.

18 Claims, 10 Drawing Sheets

(56) References Cited

OTHER PUBLICATIONS

M. Andy Kass and Yaoguo Li, "Use of principal component analysis in the de-noising and signalseparation of transient electromagnetic data", 2007, The 3$^{rd}$ International Conference on Environmental and Engineering Geophysics (ICEEG), pp. 1-7.*

Unknown, "Intelligent Solutions for Today's Data Challenges", no date, Petrolink, pp. 1-2.*

Unknown, "Geosteering: The Key for Successful Well Placement", 2013, Scientific Drilling, pp. 1.*

Song et al., "Model-guided Geosteering for Horizontal Drilling", 2009, pp. 1-23, http://hdl.handle.net/1721.1/68562.*

C. Leonard Bennett, "Time-Domain Electromagnetics and Its Applications", Mar. 3, 1978, Proceeding of the IEEE, vol. 66, No. 3 pp. 299-318.*

James Brady et al., "Electromagnetic Sounding for Hydrocarbons", 2009, Oilfield Reviw, vol. 21, No. 1, pp. 4-19.*

Notification of Transmittal of the International Search Report and the Written Opinion of the International Searching Authority, or the Declaration; PCT/RU2012/000938; dated Sep. 19, 2013; 13 pages.

Ji et al., "A Study on Solution of Transient Electromagnetic Response during Transmitting Current Turn-off in the Attem System", Chinese Journal of Geophysics, vol. 49, No. 6, 2006, pp. 1718-1725.

Furse et al., "Faster than Fourier: ultra-efficient time-to-frequency-domain. Conversions for FDTD simulations", IEEE Antennas and Propagation Magazine, vol. 42, No. 6, Dec. 2000, pp. 24-34.

Hue et al., "Modeling of EM logging tools in arbitrary 3-D borehole geometries using PML-FDTD", IEEE GeoScience and Remot Sensing Letters, vol. 2., No. 1, Jan. 2005, pp. 78-81.

Hue et al., "Three-dimensional simulation of eccentric LWD tool response in boreholes through dipping formations", IEEE Transactiosn on GeoScience and Remote Sensiing, vol. 43, No. 2, Feb. 2005, pp. 257-268.

Lee et al., "Cylindrical fdtd analysis of lwd tools through anisotropic dipping-layered earth media", IEEE Transactions on GeoScience and Remote Sensing, vol. 45, No. 2, Feb. 2007, pp. 383-388.

Liu et al., "A new efficient FDTD time-to-frequency domain Conversion algorithm", Progress in Electromagnetics Research, Pier 92, 2009, pp. 33-46.

\* cited by examiner

APPARATUS AND METHOD FOR DOWNHOLE TRANSIENT RESISTIVITY MEASUREMENT AND INVERSION

CROSS-REFERENCE TO RELATED APPLICATIONS AND PRIORITY CLAIM

This application claims the benefit of PCT Application No. PCT/RU2012/000938, entitled "APPARATUS AND METHOD FOR DOWNHOLE TRANSIENT RESISTIVITY MEASUREMENT AND INVERSION", filed Nov. 15, 2012, which is incorporated herein by reference in its entirety.

BACKGROUND

Various techniques are used to measure formation properties, such as transient electromagnetic (EM) measurement techniques. Transient EM methods such as deep transient logging while drilling (LWD), especially using "look-ahead" capability, have been shown to have great use in geologic formation evaluation and measurement. Transient EM techniques involve disposing a tool including at least one transmitter and receiver, and transmitting transient pulses of current into a formation. The induced electromagnetic field and decay responses are measured.

Various inversion techniques can be utilized to model earth formations based on measured TEM data. An ongoing challenge for transient EM techniques is the reduction of time required to perform inversion of the measured data, especially for techniques in which the inversion is performed in real time, such as during LWD operations. Numerical modeling of synthetic transient signals is time-consuming because, in many instances, synthetic time-dependent signals used for modeling must be calculated by inverse Fourier transform of frequency-dependent signals.

SUMMARY

A method of processing electromagnetic signal data includes: disposing a downhole tool in a borehole in an earth formation, the downhole tool including at least one electromagnetic transmitter; performing a downhole electromagnetic operation, the operation including transmitting an electromagnetic pulse from the transmitter into the formation and measuring a time domain transient electromagnetic (TEM) signal over a selected time interval following a transmitter turn-off time; transforming the measured time domain TEM signal into a frequency domain TEM signal measured; and applying an inversion technique to the transformed frequency domain TEM signal to estimate one or more formation parameters.

An apparatus for processing electromagnetic signal data includes: a downhole tool configured to be disposed in a borehole in an earth formation, the downhole tool including a conductive carrier, a transmitter, a first receiver disposed at a first axial distance ($L_1$) from the transmitter, and a second receiver disposed at a second axial distance ($L_2$) from the transmitter that is less than the first axial distance; and a processor. The processor is configured to perform: transmitting electromagnetic pulses from the transmitter into the formation and measuring a time domain transient electromagnetic (TEM) signal via the first and second receivers over a selected time interval following a transmitter turn-off time; transforming the time domain TEM signal into a frequency domain TEM signal measured; and applying an inversion technique to the transformed frequency domain TEM signal to estimate one or more formation parameters.

BRIEF DESCRIPTION OF THE DRAWINGS

The following descriptions should not be considered limiting in any way. With reference to the accompanying drawings, like elements are numbered alike.

DETAILED DESCRIPTION

Apparatuses and methods are provided for performing transient electromagnetic (EM) measurement operations, such as logging-while-drilling (LWD) operations. An exemplary method is provided for transformation and/or inversion of Transient EM (TEM) data obtained from borehole logging operations. In one embodiment, the method includes receiving measured transient EM data, and transforming the measured TEM data from time domain to frequency domain via a suitable transformation prior to inversion. A modeling or inversion algorithm is applied to the transformed transient EM data to estimate properties of the formation. For example, the transformed TEM data is inverted using any suitable inversion technique to yield one or more models of formation parameters.

In one embodiment, the transformation of TEM data to the frequency domain includes estimation of a primary field component of the TEM data and extraction of the primary field from the measured TEM signal. This transformation allows for the use of relatively short time intervals, e.g., such as those used in TEM logging, to restore frequency signals.

Figure 1:
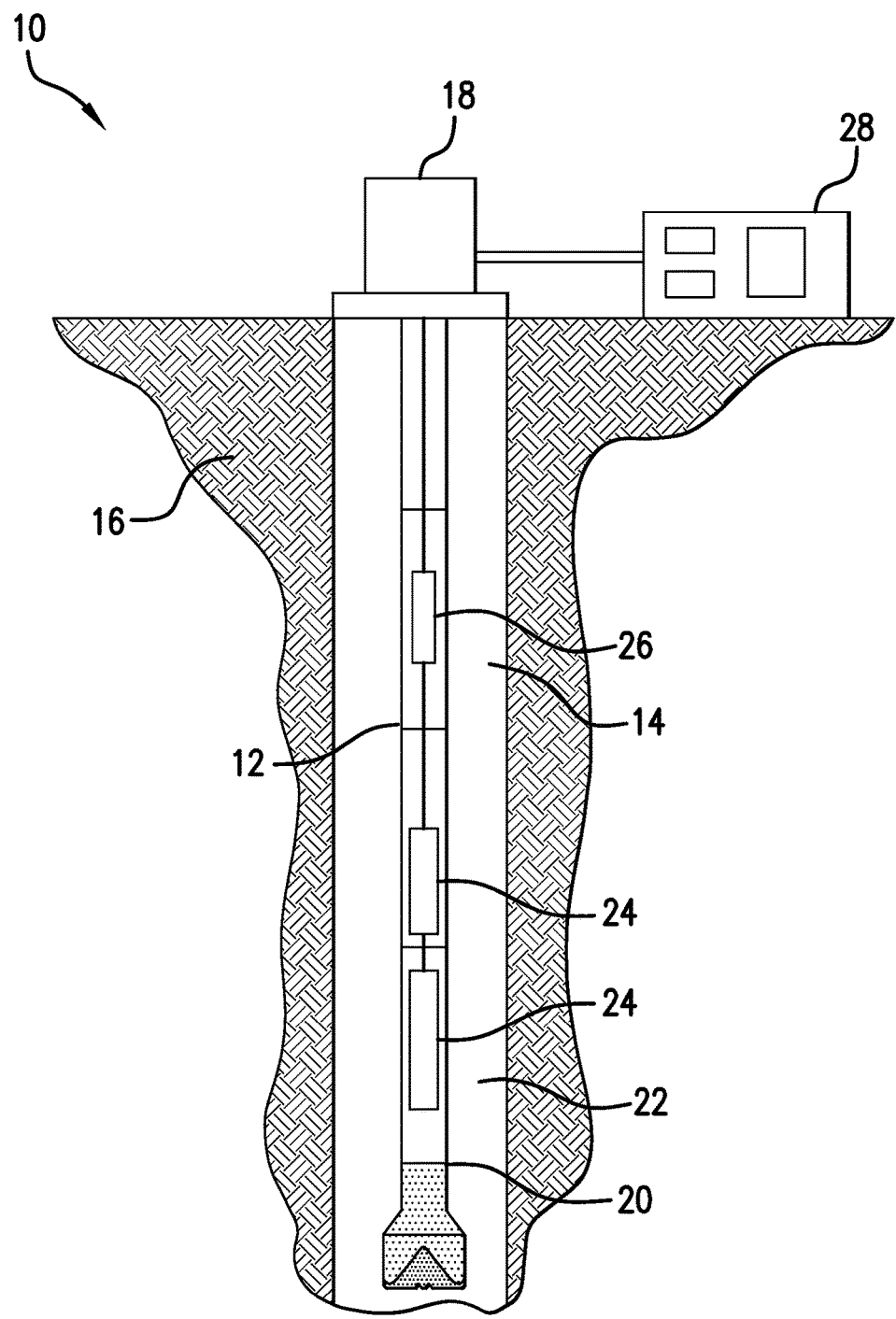
FIG. 1 depicts an exemplary embodiment of a drilling, formation evaluation and/or production system.

Referring to FIG. 1, an exemplary embodiment of a well drilling, logging and/or production system 10 includes a borehole string 12 that is shown disposed in a wellbore or borehole 14 that penetrates at least one earth formation 16 during a drilling or other downhole operation. A surface structure 18 includes various components such as a wellhead, derrick and/or rotary table or supporting the borehole string, lowering string sections or other downhole components. In one embodiment, the borehole string 12 is a drillstring including one or more drill pipe sections that extend downward into the borehole 14, and is connected to a drilling assembly 20. In one embodiment, system 10 includes any number of downhole tools 24 for various processes including formation drilling, geosteering, and formation evaluation (FE) for measuring versus depth and/or time one or more physical quantities in or around a borehole. The tool 24 may be included in or embodied as a bottomhole assembly (BHA) 22, drillstring component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

The tool 24, the BHA 22 or other portions of the borehole string 12 includes sensor devices configured to measure various parameters of the formation and/or borehole. In one embodiment, the sensor devices include one or more transmitters and receivers configured to transmit and receive electromagnetic signals for measurement of formation properties such as composition, resistivity and permeability. An exemplary measurement technique is a transient EM technique.

In one embodiment, the tool 24, BHA 22 and/or sensor devices include and/or are configured to communicate with a processor to receive, measure and/or estimate directional and other characteristics of the downhole components, borehole and/or the formation. For example, the tool 24 is equipped with transmission equipment to communicate with a processor such as a downhole processor 26 or a surface processing unit 28. Such transmission equipment may take any desired form, and different transmission media and connections may be used. Examples of connections include wired, fiber optic, acoustic, wireless connections and mud pulse telemetry.

The processor may be configured to receive data from the tool 24 and/or process the data to generate formation parameter information. In one embodiment, the surface processing unit 28 is configured as a surface drilling control unit which controls various drilling parameters such as rotary speed, weight-on-bit, drilling fluid flow parameters and others.

Figure 2:
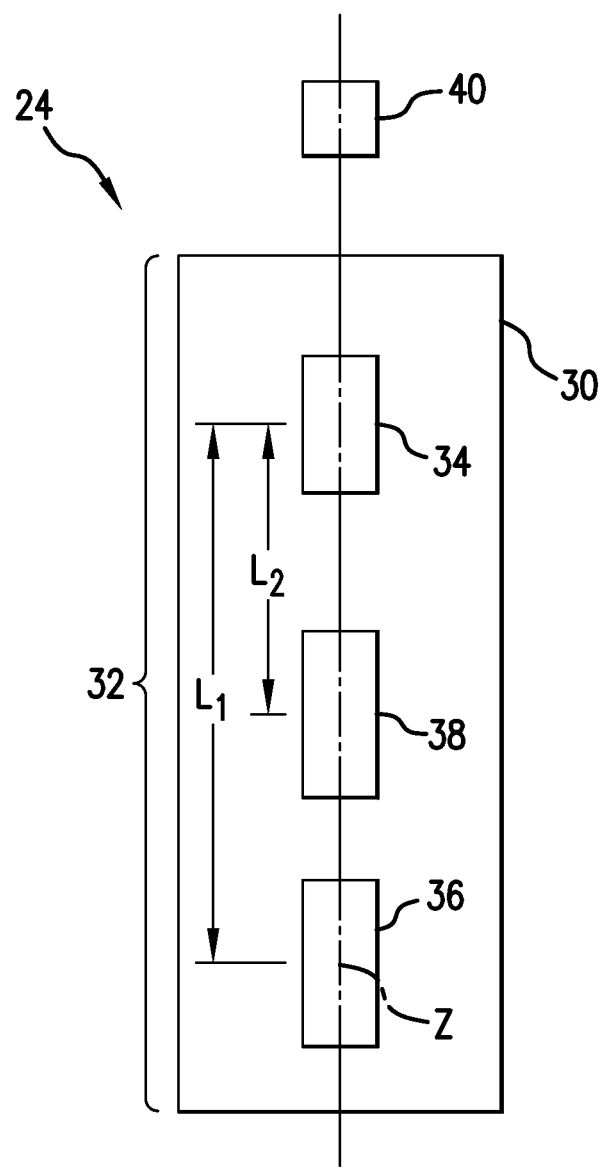
FIG. 2 depicts an exemplary embodiment of a downhole tool.

FIG. 2 illustrates an embodiment of the downhole tool 24. The downhole tool 24 is disposed in a carrier such as a housing 30. The housing is incorporated as or in a downhole component such as a borehole string section, a drill pipe or a drill collar. The tool 24 includes a resistivity measurement assembly 32 incorporating at least one electromagnetic (EM) source and multiple EM receivers. An EM transmitter 34 (e.g., a transmitter antenna or coil) is configured to emit an electromagnetic field into the formation 16 and induce a magnetic field response that is measured by one or more EM receivers 36 and 38 (e.g., receiver coils). An electric source 40, which may be disposed downhole or at a surface location, is configured to apply electric current to the transmitter 34.

In one embodiment, the measurement assembly 32 is configured to perform an inductive transient EM measurement operation. The source 40 applies transient pulses of current to the transmitter 34, which induces current in the formation 16. The current generates a magnetic field that is detected by the receivers 36 and 38.

The tool 24 utilizes electromagnetic measurements to determine the electrical conductivity of formations surrounding the borehole. Various types of tools may be employed to measure formations at various "depths of investigations" or DOI, which correspond to distances from the tool and/or borehole in a direction perpendicular to an axis of the tool and/or borehole (e.g., the Z axis of FIG. 2). Transient EM methods are particularly useful for ultra-deep investigations (e.g., radial distances of 10s to hundreds of meters from the tool and/or borehole). Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths.

In one embodiment, the transmitter and the receivers are disposed axially relative to one another. An "axial" location refers to a location along the Z axis that extends along a length of the tool 24 and/or borehole 14. The first receiver 36 is positioned at a selected axial distance $L_1$ from the transmitter 34, and the second receiver 38 is positioned at a shorter axial distance $L_2$ from the transmitter.

In one embodiment, the receivers 36 and 38 are identical or at least substantially identical, such that they would measure the same signal if the receivers are disposed at the same axial and radial location. For example, the receivers 36 and 38 each have the same (or at least substantially the same) configuration parameters. Such parameters include the number and diameter of coil windings, the coil material, the effective area, the magnetic field to voltage conversion factor and/or voltage gain.

Figure 3:
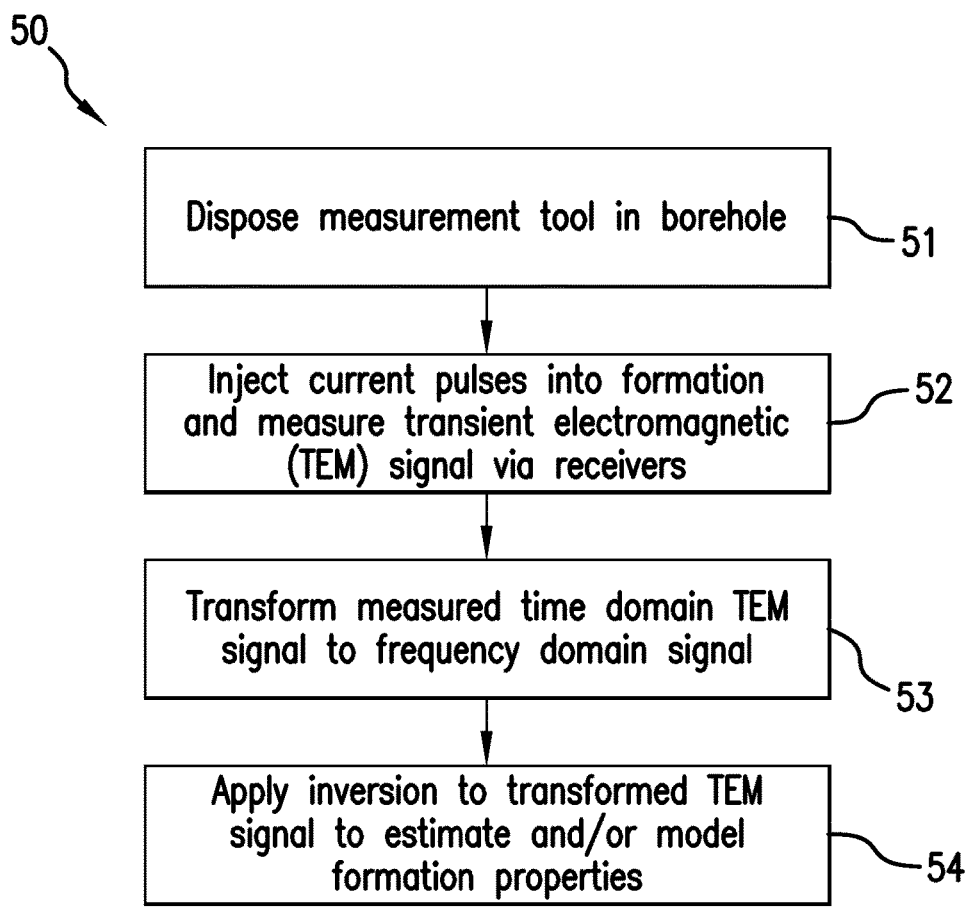
FIG. 3 is a flow chart providing an exemplary method of processing electromagnetic signal data and/or measuring formation properties.

FIG. 3 illustrates a method 50 for processing electromagnetic signal measurements and/or measuring parameters of an earth formation using electromagnetic signal measurements. The method 50 includes one or more of stages 51-54 described herein. The method may be performed continuously or intermittently as desired. The method is described herein in conjunction with the tool 24, although the method may be performed in conjunction with any number and configuration of processors, sensors and tools. The method may be performed by one or more processors or other devices capable of receiving and processing measurement data. In one embodiment, the method includes the execution of all of stages 51-54 in the order described. However, certain stages 51-54 may be omitted, stages may be added, or the order of the stages changed.

In the first stage 51, the tool 24 is lowered in the borehole. The tool 24 may be lowered, for example, during a drilling operation, LWD operation or via a wireline.

In the second stage 52, current is applied to the transmitter 34 and the receivers 36 and 38 measure signals from the formation during a selected time interval. The measured transient electromagnetic (TEM) signals are recorded at multiple times. In one embodiment, the measured TEM signals are voltage signals $$\frac{d\vec{B}(t)}{dt}$$

or $\vec{G}(t)$ recorded over a selected time period.

In the third stage 53, prior to inversion of the measured TEM signal data, a transformation is applied to the measured time domain TEM signal to produce a frequency domain TEM signal. Transformation of the time domain measurements to the frequency domain allows for more efficient use of algorithms and codes of forward modeling and inversion that are developed for frequency measurements. Such transformation of the measured TEM signal data saves considerable calculation time relative to typical prior art methods.

Such prior art methods require transformation of frequency domain models to the time domain in order to analyze the measured time domain TEM data. The time of calculation using prior art time-dependent signals can exceed hundreds of times the time of calculation using frequency-dependent signals as described herein.

In one embodiment, the measured TEM signal data is transformed using a Fourier transform. For example, the following formula is used to transform a measured time-domain signal $$\frac{d\vec{B}(t)}{dt}$$

to the frequency domain:

$$\vec{H}^*(f) = -\frac{1}{\mu_0} \int_{t_1}^{t_n} \frac{d\vec{B}(t)}{dt} e^{i2\pi ft} dt, \quad (1)$$

where $$\frac{d\vec{B}(t)}{dt}$$

is the time derivative of the magnetic field or the measured voltage resulting from a turn-off current impulse in a transmitter coil, $[t_1, t_n]$ is the measurement time interval, $\vec{H}^*(f)$ is the frequency-dependent magnetic field, and $\mu_0$ is magnetic permeability.

In the case of an arbitrary current impulse, equation (1) transforms into:

$$\vec{H}^*(f) = -\frac{1}{I^*(f)} \cdot \frac{1}{i2\pi f \mu_0} \int_{t_1}^{t_n} \frac{d\vec{B}(t)}{dt} e^{i2\pi ft} dt, \quad (2)$$

where $$\frac{d\vec{B}(t)}{dt}$$

is the derivative of the magnetic field or the measured voltage resulting from an arbitrary current impulse in the transmitter coil, and $I^*(f)$ is the frequency spectrum (or Fourier transform) of the current impulse.

A problem occurs in the integration over finite interval from $t_1$ (the time at which measurement of formation TEM signals resulting from a current pulse commences) to $t_n$ (the latest time at which TEM signals resulting from the current pulse are measured), whereas the Fourier transform is defined as an integral over an infinite axis t (from 0 to infinity). The behavior of the integrand at $[0, t_1]$ isn't known excepting the fact that it goes to zero at zero. Thus, selection of $t_1$ has an impact on the accuracy of the transformation. The selection of $t_1$ represents a balance between transformation accuracy ($t_1$ should be early enough such that the accuracy is sufficiently high) and reduction of the time interval necessary to calculate the frequency signal, e.g., so that the length of the time interval more closely corresponds with the pulse length.

The voltage for a specific tool, e.g., the tool 24 shown in FIG. 2, can be calculated as follows. An exemplary measured signal can be represented by the following:

$$\vec{G}(t) = \frac{d\vec{B}_1(t)}{dt} - \frac{M_1}{M_2} \cdot \frac{d\vec{B}_2(t)}{dt} \quad (3)$$

where $$\frac{d\vec{B}_1(t)}{dt}, \frac{d\vec{B}_2(t)}{dt}$$

are the time derivatives of magnetic fields or measured voltages from two receivers with spacings $L_1$ and $L_2$, and $M_1$ and $M_2$ are the moments of the receivers equal to the voltages in air. In one embodiment, in order to reduce the influence of the drill pipe or housing, the moments are assumed to not depend on time and $$\frac{M_1}{M_2} = \left(\frac{L_2}{L_1}\right)^3.$$

The magnetic field in the frequency domain F(f) can be represented by:

$$\vec{F}(f) = \vec{H}_1^*(f) - \left(\frac{L_2}{L_1}\right)^3 \cdot \vec{H}_2^*(f), \quad (4)$$

where $H_1^*(f)$ and $H_2^*(f)$ are the Fourier transforms of the voltages $$\frac{d\vec{B}_1(t)}{dt}, \frac{d\vec{B}_2(t)}{dt}.$$

In one embodiment, the transformation includes subtraction of an estimated primary field signal from the measured TEM signal. An exemplary formula for transformation including subtraction of the primary field is as follows:

$$\vec{H}^*(f) = \vec{H}^{*0}(f) - \frac{1}{\mu_0} \int_{t_1}^{t_n} \left(\frac{d\vec{B}(t)}{dt} - \frac{d\vec{B}^0(t)}{dt}\right) e^{i2\pi ft} dt \quad (5)$$

where $$\frac{d\vec{B}(t)}{dt}$$

is the time derivative of the magnetic field or measured voltage due to an arbitrary current impulse in the transmitter, and $$\frac{d\vec{B}^0(t)}{dt}$$

is a synthetic TEM voltage signal calculated based on a homogeneous medium having a resistivity equal to an apparent resistivity calculated from the measure TEM signal, and is considered the component of the measured voltage corresponding to the primary field. $H^{*0}(f)$ is the synthetic TEM signal in the frequency domain, which can be calculated directly in the frequency domain using a suitable analytic formula.

In the fourth stage 54, after the transformation, algorithms of inversion and/or modeling are applied to frequency data for the purpose of, e.g., formation evaluation and geosteering. The frequency domain TEM signals are inverted to provide estimations of formation properties, such as resistivities and distances to interfaces or boundaries in the formation. Any suitable inversion can be employed to estimate or model formation properties.

Figure 4:
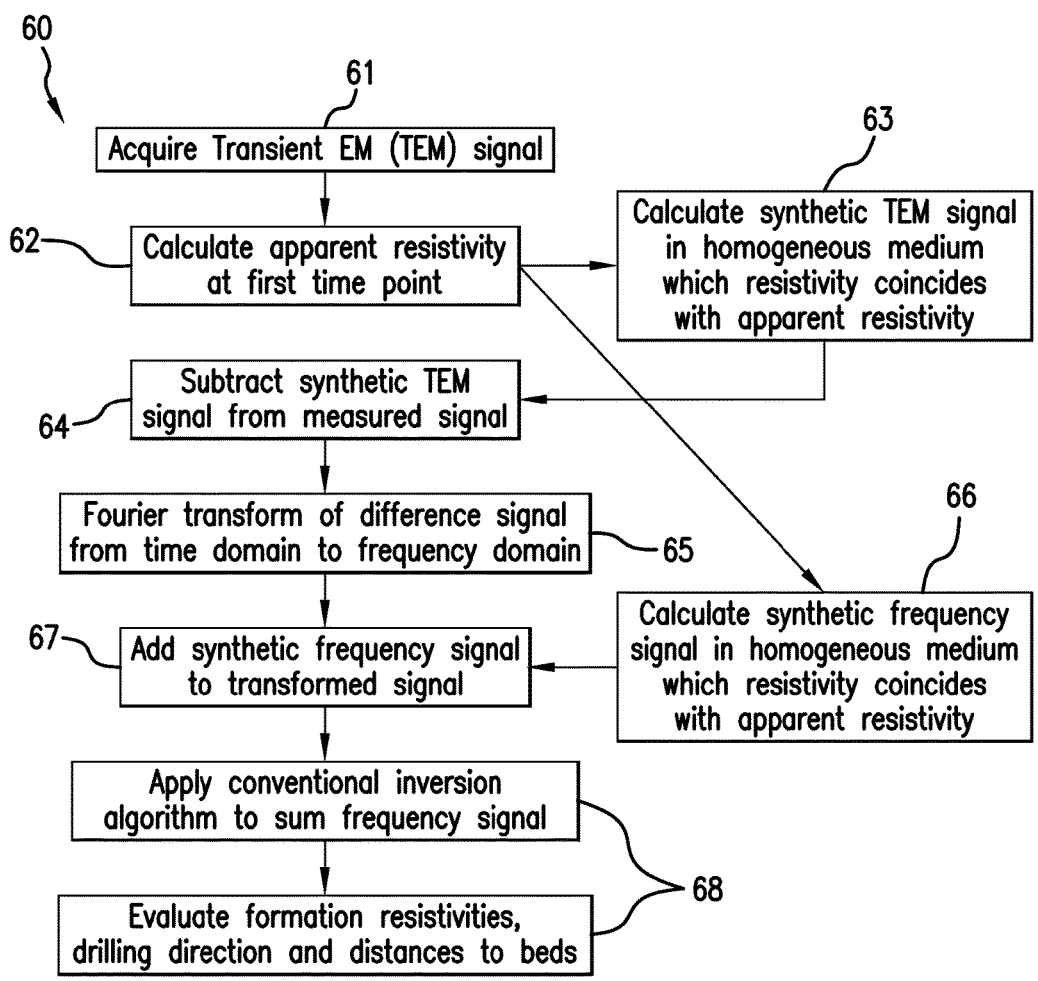
FIG. 4 is a flow chart providing an exemplary method of processing electromagnetic signal data and/or measuring formation properties.

FIG. 4 illustrates a method 60 for processing electromagnetic signal measurements and/or measuring parameters of an earth formation using electromagnetic signal measurement, including subtracting a calculated primary field signal from measured TEM signals prior to transformation. The method 60 includes one or more of stages 61-68 described herein. The method can be performed by systems or devices such as those described in conjunction with the method 50.

In the first stage 61, a measured transient EM (TEM) signal is acquired. In one embodiment, a downhole tool such as the tool 24, generates a pulsed electromagnetic field via the transmitter 36, and measures a time domain TEM signal via the receivers 34 and 36.

In the second stage 62, using known tool parameters (e.g., relative transmitter and receiver positions) and one or more assumptions about the medium in which the tool is disposed, apparent resistivity is calculated based on the measured time domain TEM signal. For example, apparent resistivity is calculated based on an assumption that the medium is homogeneous.

A time interval for calculation of apparent resistivity between time $t_1$ and $t_n$ is selected. For example, $t_n$ is 0.5 ms. The initial time $t_1$ is the earliest time selected to provide required accuracy of $\vec{F}(t)$ calculation, i.e., the Fourier transform of the measured TEM data. In this example, the calculation of the z-component $F_z(f)$ of the transformed signal is considered.

The apparent resistivity A(t) corresponding to the measured signal G(t), e.g., the z-component of the voltage $G_z(t)$ in the tool direction, is calculated for a homogeneous medium using a selected method or algorithm.

Figure 5:
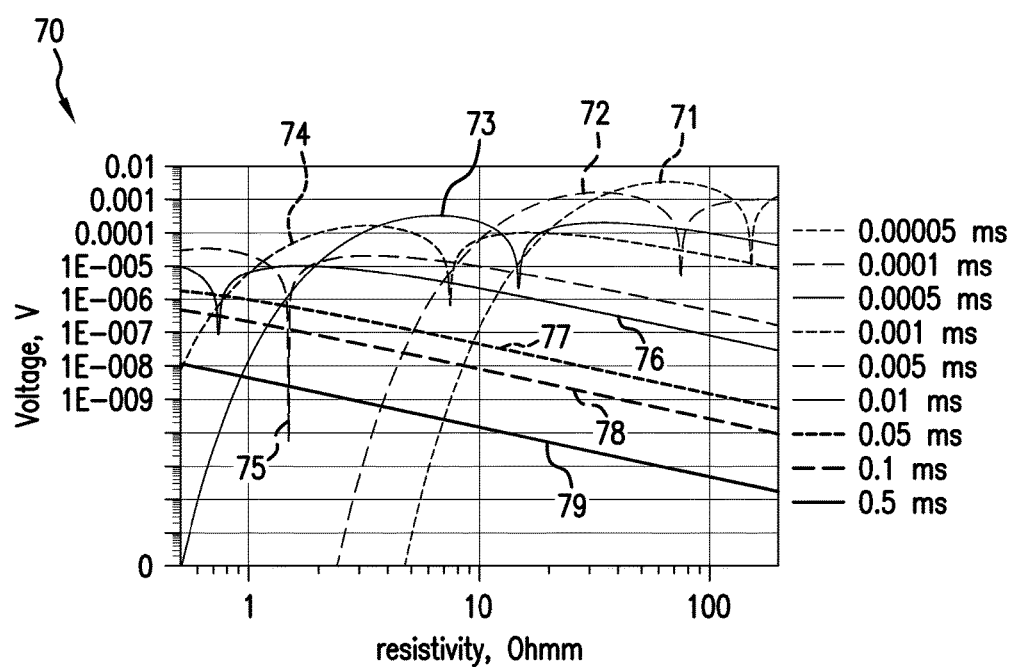
FIG. 5 depicts a model of voltage in a homogeneous medium depending on the medium's resistivity.

An exemplary algorithm for calculating apparent resistivity uses a model 70 shown in FIG. 5, which shows voltage $G_z(t)$ as a function of resistivity in a homogeneous medium at different times from 0.05 μs to 0.5 ms. The resistivity in this model ranges from about 0.5 Ohm·m to 200 Ohm·m. Curves 71, 72, 73, 74, 75, 76, 77, 78 and 79 show resistivity vs. voltage at times 0.05 μs, 0.1 μs, 0.5 μs, 1 μs, 5 μs, 0.01 ms, 0.05 ms, 0.1 ms and 0.5 ms respectively.

In this example, the receiver distance $L_1$ is about 7 meters and the receiver distance $L_2$ is about 5 meters. The tool is chosen to provide deep resistivity measurements, using frequencies between about 2 to 600 KHz. Such frequency range allows a high depth of investigation (DOI).

The curves at early times up (i.e., curves corresponding to times 0.05 μs to 5 μs) are non-monotonic, which means that more than one apparent resistivity can potentially be calculated for a specific time. At later times, the curves are monotonous, so that only one solution for the apparent resistivity is possible.

Thus, for the example of FIG. 5, an exemplary algorithm for calculating an apparent resistivity curve includes calculating the resistivity starting from the latest time interval (e.g., 0.5 ms, which in this case yields only one solution) and working back to the earliest time interval. If two or more solutions appear at an earlier time, the solution is chosen that maintains the apparent resistivity curve as a monotonic curve. If a single solution based on this criteria does not exist, the solution is chosen to be the one that is closest to an adjacent value. If a solution is absent at a time, then apparent resistivity is considered to be undefined at that time.

From the calculated apparent resistivity curve, an apparent resistivity is selected for calculation of a synthetic TEM signal corresponding to the primary signal. In one embodiment, the selected apparent resistivity value is that for the earliest time in which the apparent resistivity can be defined.

In the third stage 63, a synthetic TEM signal corresponding to the primary field, i.e., the magnetic field due directly to the transmitter, is estimated.

The synthetic TEM signal is calculated for a homogeneous medium having a resistivity equal to the apparent resistivity calculated at an early time within the measurement time interval. In one embodiment, the resistivity is assumed to be the calculated apparent resistivity at the earliest time within the measurement time interval. For example, based on the model 70, the apparent resistivity calculated from the measured TEM signal at time 0.05 μs is used to calculate the synthetic TEM signal.

As described herein, an "early time" is considered to be a time at which the measured magnetic field is at least substantially equal to the primary field, or at which the primary field makes up a selected portion of the measured magnetic field. This early time can be determined empirically through experimentation or through previous measurement operations.

A homogeneous medium is selected that has a resistivity that coincides with the selected apparent resistivity. Based on this medium and additional parameters of the tool 24, e.g., the type, operational parameters and configuration of the transmitter and receivers, a synthetic time domain TEM signal that would be measured due to the transmitter is calculated.

In the fourth stage 64, the synthetic TEM signal is subtracted from the measured TEM signal. This subtraction yields an estimated time domain secondary field signal (i.e., signal corresponding to magnetic field generated by the remote formation).

In the fifth stage 65, a Fourier transform is applied to the estimated secondary field signal to yield a secondary frequency signal. The following exemplary formula for transformation may be used:

$$\vec{H}^*(f) = \vec{H}^{*0}(f) - \frac{1}{\mu_0} \int_{t_1}^{t_n} \left( \frac{d\vec{B}(t)}{dt} - \frac{d\vec{B}^0(t)}{dt} \right) e^{i2\pi f t} \, dt \qquad (5)$$

where $$\frac{d\vec{B}(t)}{dt}$$

is the measured voltage in transmitter coil, and $$\frac{d\vec{B}^0(t)}{dt}$$

is the synthetic TEM signal (e.g., voltage signal).

In the sixth stage 66, a synthetic frequency signal is calculated directly in the frequency domain using, e.g., a simple analytic formula.

In the seventh stage 67, the synthetic frequency signal is added back to the secondary frequency signal to generate a summed frequency domain measured TEM signal.

In the eight stage 68, a selected inversion algorithm is applied to the summed frequency domain measured TEM signal. Various formation properties, such as resistivities, drilling direction and distances to interfaces or boundaries are estimated based on the inversion.

Figure 6:
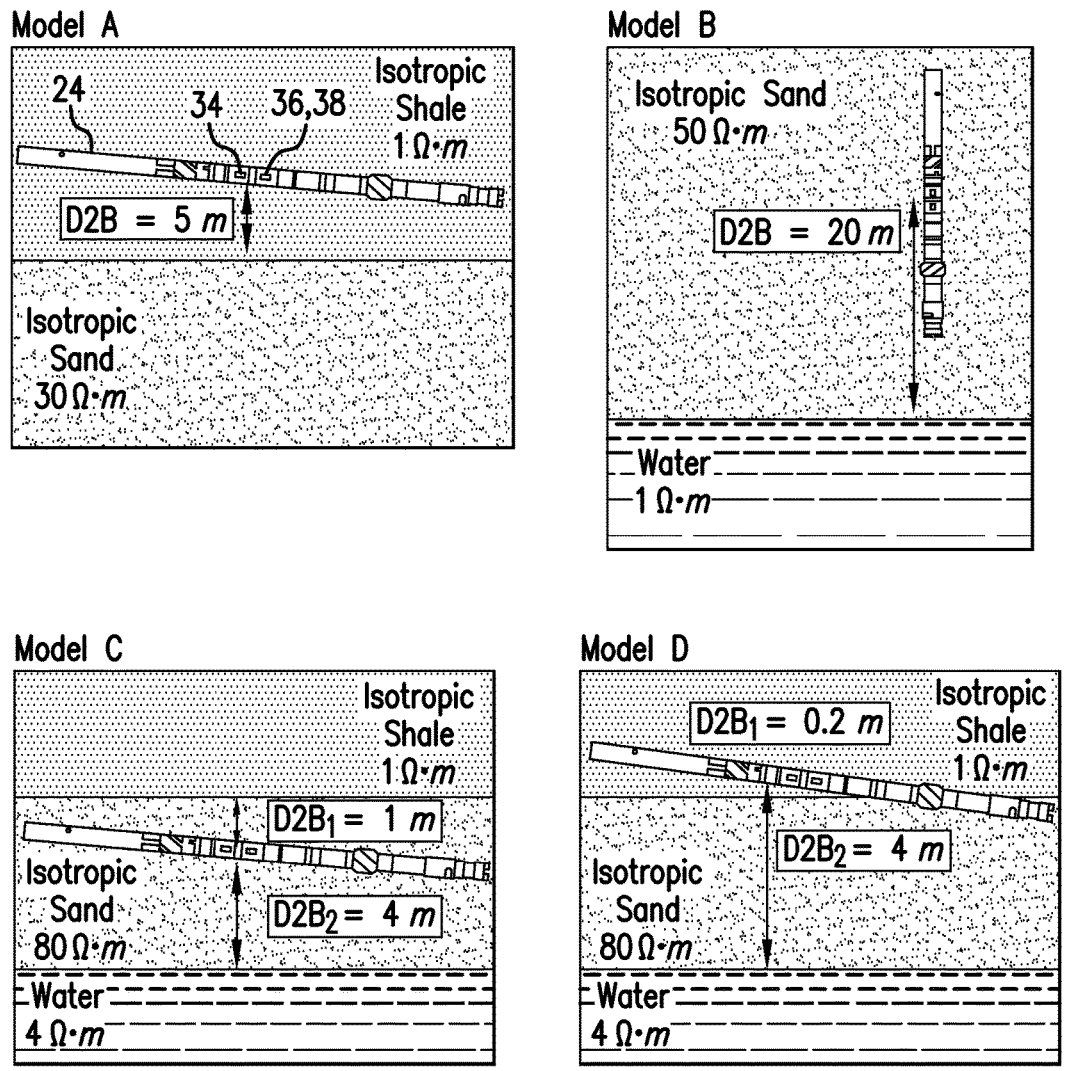
FIG. 6 shows exemplary models (A-D) of formations.

FIG. 6 shows exemplary formation models (Models A-D) of a tool 24 disposed in a formation, for which exemplary calculations using the method 70 are described. Model A shows a tool disposed in a shale layer (resistivity of 1 ohm-m) above an oil-bearing sand layer (resistivity of 30 ohm-m). The distance from the transmitter to the boundary ("D2B") between the layers in this model is about 5 m, and the tool has a dip angle of 85 degrees. Model B shows a tool disposed in oil-bearing sand (50 ohm-m) above water (1 ohm-m), having a D2B of about 20 meters and a dip angle of zero degrees. Models C and D show a tool (dip angle of 80 degrees) disposed in sand (80 ohm-m) with shale (1 ohm-m) above and water (4 ohm-m) below. The tool of Model C has a distance to the sand-shale boundary ("D2B$_1$") of about 1 meter a distance to the sand-water boundary ("D2B$_2$") of about 4 meters. The tool of Model D has a D2B$_1$ of about 0.2 m, and a D2B$_2$ of about 4 meters.

FIGS. 7-10 show results of calculations for each of the Models A-D using the method 70. Time intervals (t$_1$) were chosen so that apparent resistivity tended to a limit at early times.

Figure 7:
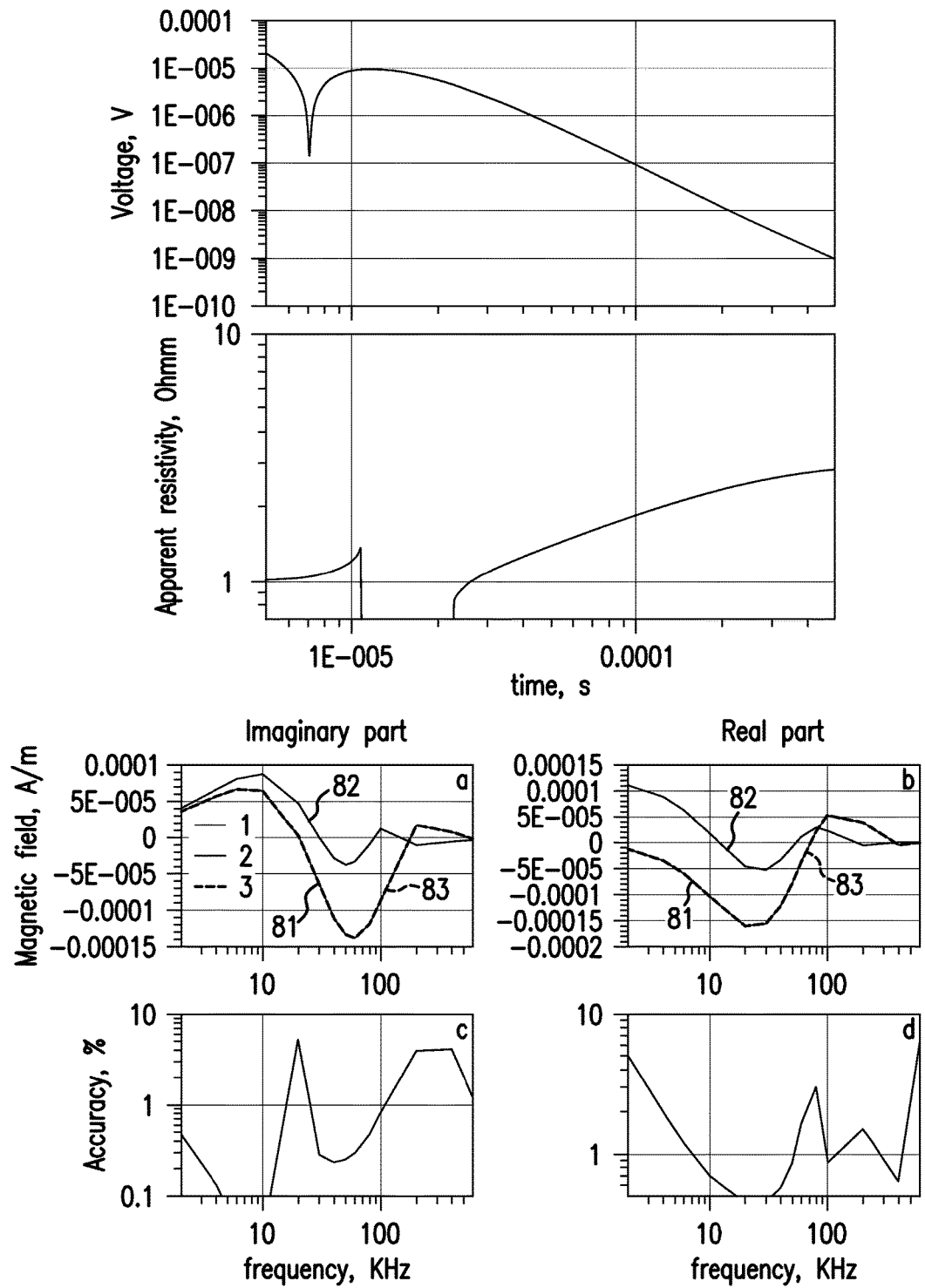
FIG. 7 shows voltage, apparent resistivity and transformed frequency signals for the model A of FIG. 6.

FIG. 7 shows signal G$_z$(t) and apparent resistivity A(t) at the time interval [5 μs, 0.5 mc] for the Model A. It is evident that at early times apparent resistivity tends to a limit. In this case it provides true resistivity of the layer where the tool is located.

FIG. 7 also shows the recovered magnetic field F$_z$(f) using direct calculation using equation (1) and calculation including the extraction of an estimated primary field using equation (5). The accuracy of the recovery at the frequency interval is also shown for the Model A. Graphs "a" and "b" show the imaginary and real part, respectively, of frequency domain signals, where curve 81 is the "true" signal for the Model A, curve 82 is the signal recovered from direct transformation of the measured TEM signal (i.e., using equation (1)) and curve 83 is the signal recovered from transformation that includes an initial extraction of the primary field (i.e., using method 70). Error curves shown in graphs "c" and "d" show the accuracy of recovery using the method 70 for the imaginary and real parts, respectively.

As is shown in FIG. 7, for the imaginary part of the recovered magnetic field, the accuracy (shown in % error) is less than 1% except at the zero crossing points. For the real part of magnetic field the accuracy is less than 1% excepting low frequencies (less than 10 KHz) and zero crossing point.

Figure 8:
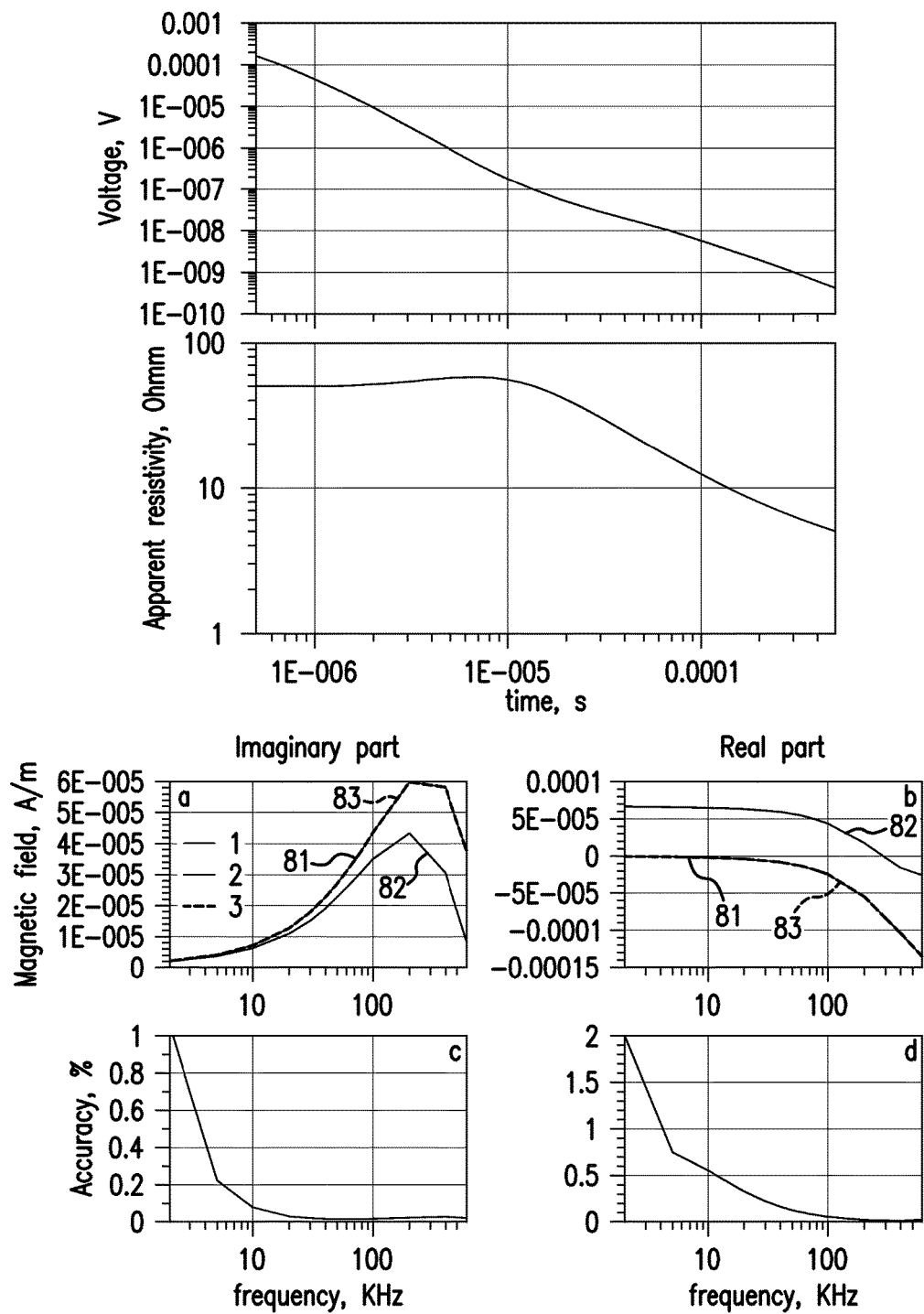
FIG. 8 shows voltage, apparent resistivity and transformed frequency signals for the model B of FIG. 6.
Figure 9:
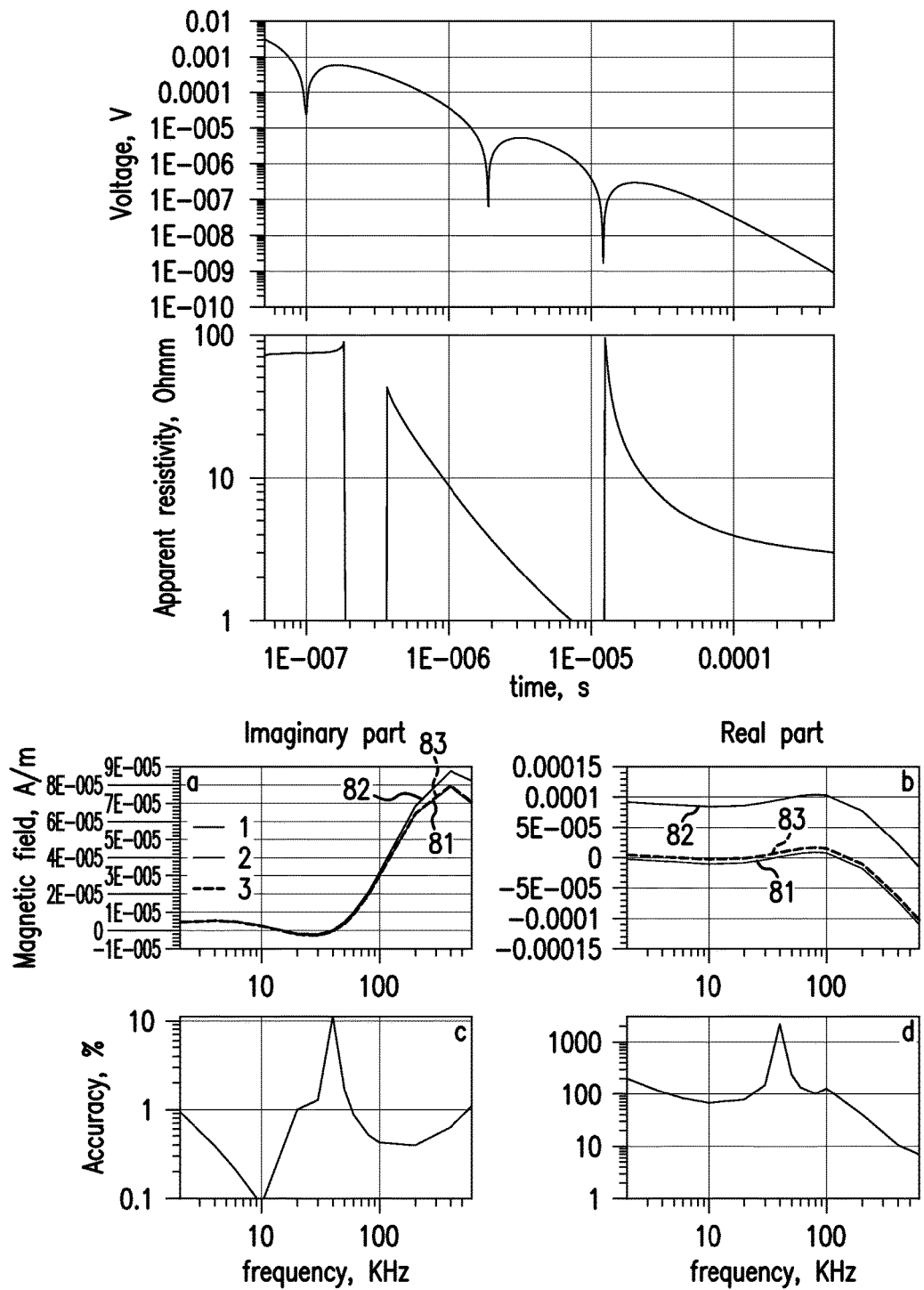
FIG. 9 shows voltage, apparent resistivity and transformed frequency signals for the model C of FIG. 6.
Figure 10:
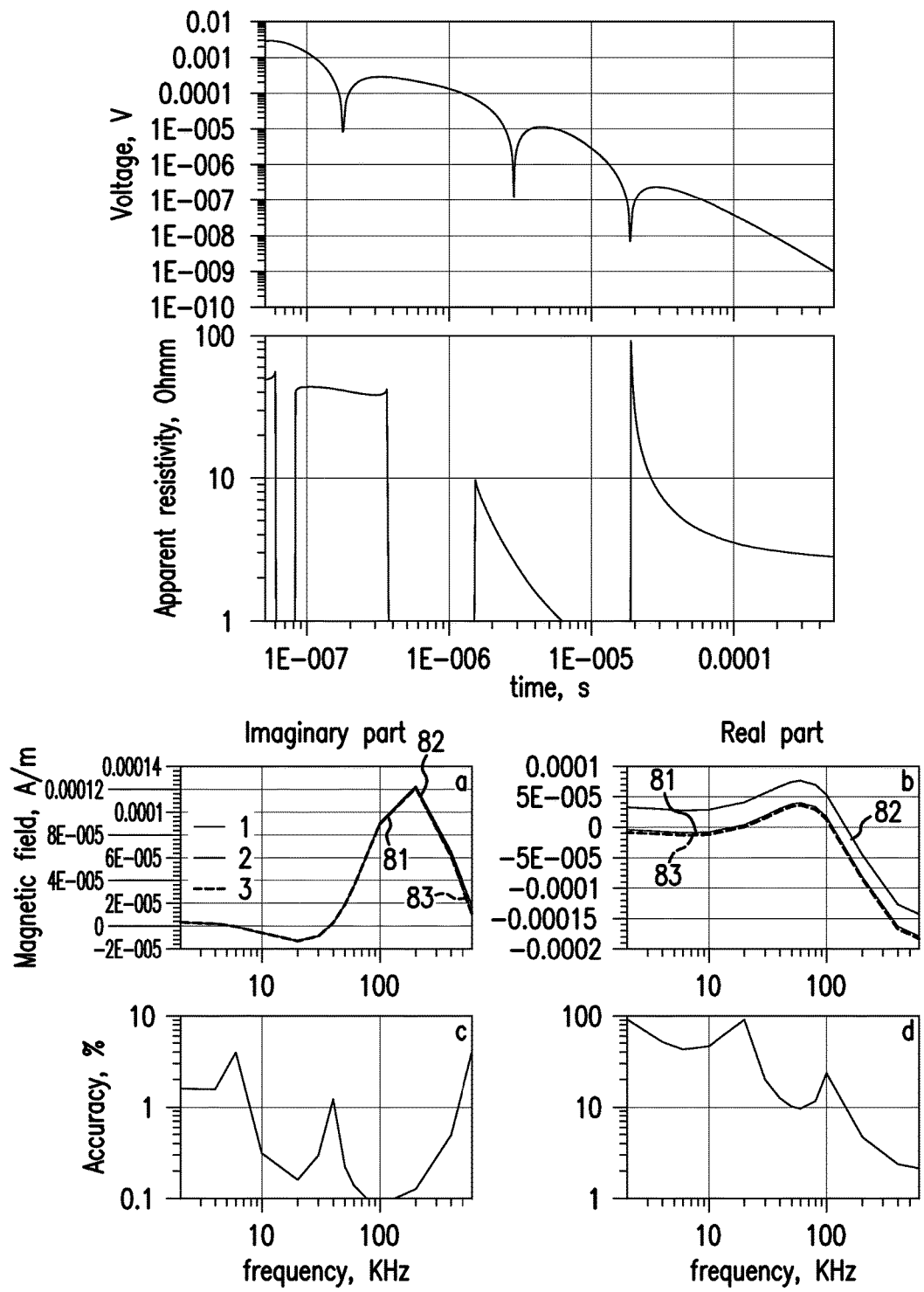
FIG. 10 shows voltage, apparent resistivity and transformed frequency signals for the model D of FIG. 6.

FIG. 8 shows voltage, apparent resistivity and results of transformation for the model B. The accuracy of calculation of the magnetic field real part is 2% at 2 KHz. FIG. 9 shows voltage, apparent resistivity and results of transformation for the model C. For imaginary part of the magnetic field the accuracy is less than 1% excepting the zero crossing point. FIG. 10 shows voltage, apparent resistivity and results of transformation for the model D. As on previous example for imaginary part of magnetic field the accuracy is less than 1% excepting the zero crossing point.

Tables 1-4 below show the sensitivity to earth formation parameters and dip angle for the time domain voltage and the imaginary part of the magnetic field in the frequency domain (calculated via method 60). Expected errors are shown for Model A (Table 1), Model B (Table 2), Model C (Table 3) and Model D (Table 4). The tool depth is the same for each model, and the frequencies are: 2.0, 4.0, 10.0, 20.0, 40.0, 60.0, 80.0, 100.0, 150.0, 200.0, 300.0, 400.0, 500.0 and 600.0 KHz. It is supposed that systematic error is 0.5% for the voltage and 1% for the magnetic field.

TABLE 1

Expected errors for Model A:

| Parameter | True value | Time domain | Frequency domain |
|---|---|---|---|
| R$_{h1}$ | 1 Ohm · m | 0.34% | 0.005% |
| R$_{h2}$ | 30 Ohm · m | 16% | 40% |
| D2B | 5 m | 0.28 m | 0.32 m |
| dip | 85 deg | 3.6 deg | 3.9 deg |

TABLE 2

Expected errors for Model B:

| Parameter | True value | Time domain | Frequency domain |
|---|---|---|---|
| R$_{h1}$ | 50 Ohm · m | 0.52% | 1.3% |
| R$_{h2}$ | 1 Ohm · m | 2.1% | 65% |
| D2B | 20 m | 0.07 m | 0.7 m |
| dip | 0 deg | 6.2 deg | 28 deg |

TABLE 3

Expected errors for Model C:

| Parameter | True value | Time domain | Frequency domain |
|---|---|---|---|
| R$_{h1}$ | 1 Ohm · m | 0.62% | 1.7% |
| R$_{h2}$ | 80 Ohm · m | 0.16% | 2.7% |
| R$_{h2}$ | 4 Ohm · m | 2.5% | 5.6% |
| D2B$_1$ | −1 m | 0.013 m | 0.031 m |
| D2B$_2$ | 4 m | 0.15 m | 0.27 m |
| dip | 80 deg | 0.33 deg | 0.33 deg |

TABLE 4

Expected errors for Model D.

| Parameter | True value | Time domain | Frequency domain |
|---|---|---|---|
| R$_{h1}$ | 1 Ohm · m | 0.41% | 1.7% |
| R$_{h2}$ | 80 Ohm · m | 1.2% | 4.5% |
| R$_{h2}$ | 4 Ohm · m | 3.1% | 7.8% |
| D2B$_1$ | 0.2 m | 0.003 m | 0.005 m |
| D2B$_2$ | 4 m | 0.056 m | 0.32 m |
| dip | 80 deg | 0.18 deg | 0.58 deg |

The results shown in Tables 1-4 demonstrate that that the sensitivity of transformed TEM signals to formation resistivities and distances to boundaries are comparable with or substantially equal to the sensitivity of the original signals.

The apparatuses and methods described herein provide various advantages over prior art techniques. For example, the transformation methods described herein substantially reduce the processing time required to apply modeling and/or inversion algorithms to measured data, which are typically developed for frequency domain measurements. Such methods make feasible the use of relatively short measurement time intervals to recover frequency signals from time-domain data with good accuracy.

Generally, some of the teachings herein are reduced to an algorithm that is stored on machine-readable media. The algorithm is implemented by a computer and provides operators with desired output.

The systems described herein may be incorporated in a computer coupled to the tool 24. Exemplary components include, without limitation, at least one processor, storage, memory, input devices, output devices and the like. As these components are known to those skilled in the art, these are not depicted in any detail herein. The computer may be disposed in at least one of a surface processing unit and a downhole component.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of processing electromagnetic signal data, the method comprising:
   disposing a downhole measurement tool with a borehole string in a borehole in an earth formation, the downhole tool including at least one electromagnetic transmitter;
   performing a downhole electromagnetic operation, the operation including transmitting an electromagnetic pulse from the at least one electromagnetic transmitter into the formation and measuring a time domain transient electromagnetic (TEM) signal over a selected time interval following a transmitter turn-off time;
   calculating an apparent resistivity of the formation at a selected time within the time interval;
   calculating a synthetic TEM signal based on a homogeneous medium having a resistivity equal to the apparent resistivity, the synthetic TEM signal corresponding to a primary magnetic field signal generated by the at least one electromagnetic transmitter;
   generating a time domain secondary signal based on comparing the measured time domain TEM signal to the synthetic time domain TEM signal;
   transforming the time domain secondary signal into a frequency domain TEM signal;
   applying an inversion technique to the transformed frequency domain TEM signal to estimate one or more formation parameters;
   estimating a distance from the measurement tool to a boundary or interface in the formation based on the one or more formation parameters; and
   geosteering the borehole string to advance the borehole string in a selected direction based on the distance to the boundary or interface from the downhole measurement tool.

2. The method of claim 1, wherein generating the time domain secondary signal includes subtracting the synthetic TEM signal from the measured time domain TEM signal.

3. The method of claim 2, wherein transforming includes calculating a synthetic frequency domain TEM signal corresponding to the primary magnetic field, and adding the synthetic frequency domain signal to the frequency domain secondary signal to generate the transformed frequency domain TEM signal.

4. The method of claim 1, wherein the selected time is an early time at which the primary magnetic field is equal to a measured magnetic field or is at least a selected portion of the magnitude of the measured magnetic field.

5. The method of claim 1, wherein calculating the synthetic time domain TEM signal includes calculating a TEM signal that would be measured over the time interval by the downhole tool based on an assumption that the downhole tool is disposed in a homogeneous medium having the calculated apparent resistivity.

6. The method of claim 1, wherein the measured time domain TEM signal is transformed via a Fourier transform.

7. The method of claim 6, wherein the measured time domain TEM signal is transformed via the following:

$$\vec{H}^*(f) = -\frac{1}{\mu_0} \int_{t_1}^{t_n} \frac{d\vec{B}(t)}{dt} e^{i2\pi f t} dt, \quad (1)$$

wherein $$\frac{d\vec{B}(t)}{dt}$$

is the derivative of the magnetic field or the measured voltage resulting from a turn-off current impulse in a transmitter coil, $[t_1, t_n]$ is the measurement time interval, $\vec{H}^*(f)$ is the frequency-dependent magnetic field, and $\mu_0$ is magnetic permeability.

8. The method of claim 6, wherein the downhole tool includes a first receiver disposed at a first axial distance ($L_1$) from the transmitter, and a second receiver disposed at a second axial distance ($L_2$) from the transmitter that is less than the first axial distance.

9. The method of claim 8, wherein the measured time domain TEM signal is transformed via the following:

$$\vec{F}(f) = \vec{H}_1^*(f) - \left(\frac{L_2}{L_1}\right)^3 \cdot \vec{H}_2^*(f),$$

wherein $H_1^*(f)$ and $H_2^*(f)$ are Fourier transforms of a voltage $$\frac{d\vec{B}_1(t)}{dt}$$

measured via the first receiver and a voltage $$\frac{d\vec{B}_2(t)}{dt}$$

measured via the second receiver, respectively.

10. The method of claim 2, wherein the measured time domain TEM signal is transformed via the following:

$$\vec{H}^*(f) = \vec{H}^{*0}(f) - \frac{1}{\mu_0} \int_{t_1}^{t_n} \left( \frac{d\vec{B}(t)}{dt} - \frac{d\vec{B}^0(t)}{dt} \right) e^{i2\pi ft} dt,$$

wherein $$\frac{d\vec{B}(t)}{dt}$$

is a measured voltage, $$\frac{d\vec{B}^0(t)}{dt}$$

is a synthetic voltage corresponding to the primary magnetic field, and $H^{*0}(f)$ is a frequency domain synthetic TEM signal.

11. An apparatus for processing electromagnetic signal data, the apparatus comprising:
   a downhole measurement tool configured to be disposed with a borehole string in a borehole in an earth formation, the downhole tool including a conductive carrier, a transmitter, a first receiver disposed at a first axial distance ($L_1$) from the transmitter, and a second receiver disposed at a second axial distance ($L_2$) from the transmitter that is less than the first axial distance; and
   a processor configured to perform:
   transmitting electromagnetic pulses from the transmitter into the formation and measuring a time domain transient electromagnetic (TEM) signal via the first and second receivers over a selected time interval following a transmitter turn-off time;
   calculating an apparent resistivity of the formation at a selected time within the time interval;
   calculating a synthetic TEM signal based on a homogeneous medium having a resistivity equal to the apparent resistivity, the synthetic TEM signal corresponding to a primary magnetic field signal generated by the at least one electromagnetic transmitter;
   generating a time domain secondary signal based on comparing the measured time domain TEM signal to the synthetic time domain TEM signal;
   transforming the time domain secondary signal into a frequency domain TEM signal measured;
   applying an inversion technique to the transformed frequency domain TEM signal to estimate one or more formation parameters;
   estimating a distance from the measurement tool to a boundary or interface in the formation based on the one or more formation parameters; and
   geosteering the borehole string to advance the borehole string in a selected direction based on the distance to the boundary or interface from the downhole measurement tool.

12. The apparatus of claim 11, wherein generating the time domain secondary signal includes subtracting the synthetic TEM signal from the measured time domain TEM signal.

13. The apparatus of claim 12, wherein transforming includes calculating a synthetic frequency domain TEM signal corresponding to the primary magnetic field, and adding the synthetic frequency domain signal to the frequency domain secondary signal to generate the transformed frequency domain TEM signal.

14. The apparatus of claim 12, wherein generating the synthetic time domain TEM signal includes calculating an apparent resistivity of the formation at a selected time within the time interval, wherein the selected time is an early time at which the primary magnetic field is equal to a measured magnetic field or is at least a selected portion of the magnitude of the measured magnetic field.

15. The apparatus of claim 14, wherein generating the synthetic time domain TEM signal includes calculating a TEM signal that would be measured over the time interval by the downhole tool based on an assumption that the downhole tool is disposed in a homogeneous medium having the calculated apparent resistivity.

16. The apparatus of claim 12, wherein the measured time domain TEM signal is transformed via the following:

$$\vec{H}^*(f) = \vec{H}^{*0}(f) - \frac{1}{\mu_0} \int_{t_1}^{t_n} \left( \frac{d\vec{B}(t)}{dt} - \frac{d\vec{B}^0(t)}{dt} \right) e^{i2\pi ft} dt,$$

wherein $$\frac{d\vec{B}(t)}{dt}$$

is a measured voltage, $$\frac{d\vec{B}^0(t)}{dt}$$

is a synthetic voltage corresponding to the primary magnetic field, and $H^{*0}(f)$ is a frequency domain synthetic TEM signal.

17. The apparatus of claim 11, wherein the downhole tool is a logging-while-drilling (LWD), and the processor is configured to at least measure the time domain transient electromagnetic (TEM) signal and transform the time domain TEM signal in real time or near real time during a drilling operation.

18. The apparatus of claim 11, wherein the processor is disposed at one of a downhole location and a surface location.

* * * * *